United States Patent [19]

Tone

[11] Patent Number: 5,097,414
[45] Date of Patent: Mar. 17, 1992

[54] BUFFER-STORAGE CONTROL SYSTEM FOR SIMULTANEOUSLY ACCESSIBLE PARTITIONS OF TAG AND DATA BLOCKS OF BUFFER STORAGE

[75] Inventor: Hirosada Tone, Fuchu, Japan

[73] Assignee: Fujitsu Limited, Kawasaki, Japan

[21] Appl. No.: 423,588

[22] Filed: Oct. 17, 1989

Related U.S. Application Data

[63] Continuation of Ser. No. 224,254, Jul. 26, 1988, abandoned, which is a continuation of Ser. No. 606,124, May 2, 1984, abandoned.

[30] Foreign Application Priority Data

May 16, 1983 [JP] Japan .............................. 58-085351

[51] Int. Cl.⁵ .................................................. G06F 12/06
[52] U.S. Cl. ........................... 395/425; 364/243.44; 364/246.3; 364/252.4; 364/964.25; 364/964.28; 364/964.32; 364/DIG. 1; 364/DIG. 2
[58] Field of Search ... 364/200 MS File, 900 MS File

[56] References Cited

U.S. PATENT DOCUMENTS

| | | |
|---|---|---|
| 4,208,716 | 6/1980 | Porter et al. |
| 4,293,910 | 10/1981 | Flusche ............................ 364/200 |
| 4,407,015 | 9/1983 | Ziobro ............................. 364/200 |
| 4,439,829 | 3/1984 | Tsiang ............................ 364/200 |
| 4,453,216 | 6/1984 | Chiba ............................. 364/200 |
| 4,493,026 | 1/1985 | Olnowich ......................... 364/200 |

OTHER PUBLICATIONS

"Computer Dictionary & Handbook" pp. 615-616 by Charles J. Sippl, Howard W. Sams & Co., Inc.
"Standard Dictionary of Computers and Information Processing" pp. 310-311 by Martin H. Weir Hayden Book Company, Inc., New York.

*Primary Examiner*—Thomas C. Lee
*Assistant Examiner*—Ken S. Kim
*Attorney, Agent, or Firm*—Staas & Halsey

[57] ABSTRACT

A buffer-storage control system used in a pipeline data processor includes a memory system having a two-level hierarchical structure composed of a main storage and a buffer storage having tag portion and a data portion, each portion being composed of a plurality of partitions. In the buffer-storage control system, the tag portion and the data portion can be independently accessed and the data portion is so constituted for every partition that it is possible to select one of a plurality of address passes and to select an address for a read access and an address for a write access for every partition, thereby simultaneously effecting a read operation and write operation in the same machine cycle and executing the read access again only when the read access and the write access are effected for the same partition.

5 Claims, 7 Drawing Sheets

BUFFER-STORAGE CONTROL SYSTEM FOR SIMULTANEOUSLY ACCESSIBLE PARTITIONS OF TAG AND DATA BLOCKS OF BUFFER STORAGE

This is a continuation of copending application(s) Ser. No. 07/224,254 filed on July 26, 1988 which is a continuation of Ser. No. 06/606,124 filed May 2, 1984 both now abandoned.

BACKGROUND OF THE INVENTION

The present invention relates to a buffer-storage control system, and more particularly a buffer-storage control system for storing accesses in a pipeline data processing system from a data processing unit and the like to a memory system having a two-level hierarchical structure composed of a main storage and a buffer storage.

A buffer storage generally comprises a tag portion (TAG) and a data portion (DATA), each of these portions comprising a plurality of ways, way portions, associative levels or partitions. In one type of buffer storage device different portions of the storage are set aside for storing the contents from corresponding portions of main memory. For example, assume that a buffer storage is divided into first through third associative levels or partitions and that the main memory is also divided into corresponding first through third partitions. In this situation data from the third main memory partition can only be stored in the third partition of this type buffer storage. That is, data from partitions in main memory is stored in corresponding partitions or associative levels in buffer storage.

Each way of the tag portion and the data portion comprises a plurality of blocks, each block being a data unit of a storing or transferring operation. The tag portion has a plurality of valid bits corresponding to the blocks for indicating block validity, i.e., indicating that data is already transferred to the corresponding block from the main storage and a write operation is possible.

In a data processing system comprising a two-level hierarchical memory system composed of a main storage and a buffer storage, when the memory system is accessed, every partition of the above-mentioned tag portion is read out simultaneously, i.e., the coincidence of addresses is checked, to determine whether or not the buffer storage stores data of a designated address. Non-coincidence of any of the addresses in the partitions with the designated address indicates that the target data is not stored in the buffer storage. Therefore, the data of the designated address is read from the main storage and transmitted to the buffer storage. Thereafter, the memory system is generally controlled so that the memory access is made to the buffer storage.

In a buffer-storage control system of a "store-through" type, when store-accessing the main storage, if an address block memorizing or storing the address corresponding to that for the store access is found in the buffer storage, the buffer storage is store-accessed at the same time. If the address block is not found in the buffer storage, the memory system is controlled so that the buffer storage is not store-accessed but only the main storage.

If the data processor for performing pipeline processing is continuously storage-accessing the buffer storage, the storing operation and fetching operation caused by a succeeding instruction will overlap and the fetching operation of the succeeding instruction will be delayed. This wastes machine cycles and reduces the processing ability of the overall computer system.

SUMMARY OF THE INVENTION

A main object of the present invention is to realize high speed processing without delay, even when write operations occur in succession, where a write operation requires two cycles of a tag access and a data writing.

It is another object of the present invention to realize the processing of a read request without delay, even when read operations occur in succession after a write operation.

According to the present invention, there is provided a buffer-storage control system for a data processor having a main storage and a buffer storage which has a tag portion and a data portion, each of the tag and data portions have a plurality of partitions, wherein a read access to the buffer storage is carried out by accessing simultaneously the tag portion and the data portion, the output of the data portion is selected on the basis of the result of a comparison in the tag portion, wherein a write access to the buffer storage is carried out by first accessing the tag in a first cycle to detect in which level the data block in question exists, and by then writing the data block into the detected level in the second cycle, wherein the tag portion and the data portion are capable of being independently accessed, and wherein the address which is the same as the address for the tag portion or another optional address can be selected as an access address for the data portion, whereby a tag access for a write access request and a writing of the other write request into the data portion can be treated in parallel.

According to the present invention, there is also provided a buffer storage control system in a data processor comprising a main storage and a buffer storage which has a tag portion and a data portion, wherein each tag and data portion is composed of a plurality of partitions, characterized in that the buffer storage control system is so constituted that the tag portion and the data portion can be independently accessed and in that the data portion is so constituted for every way that it is possible to select one of a plurality of address passes signal paths and to select an address for a read access and an address for a write access for every way, thereby simultaneously effecting a read operation and a write operation in the same machine cycle and executing the read access again only when the read access and the write access are effected for the same way.

BRIEF DESCRIPTION OF THE DRAWINGS

These and other objects and advantages of the present invention will become clearer from the ensuing description of preferred embodiments in reference to the attached drawings, in which.

DESCRIPTION OF THE PREFERRED EMBODIMENTS

Before describing the preferred embodiments, an explanation will be made of a conventional buffer-storage control system for reference.

Figure 1:
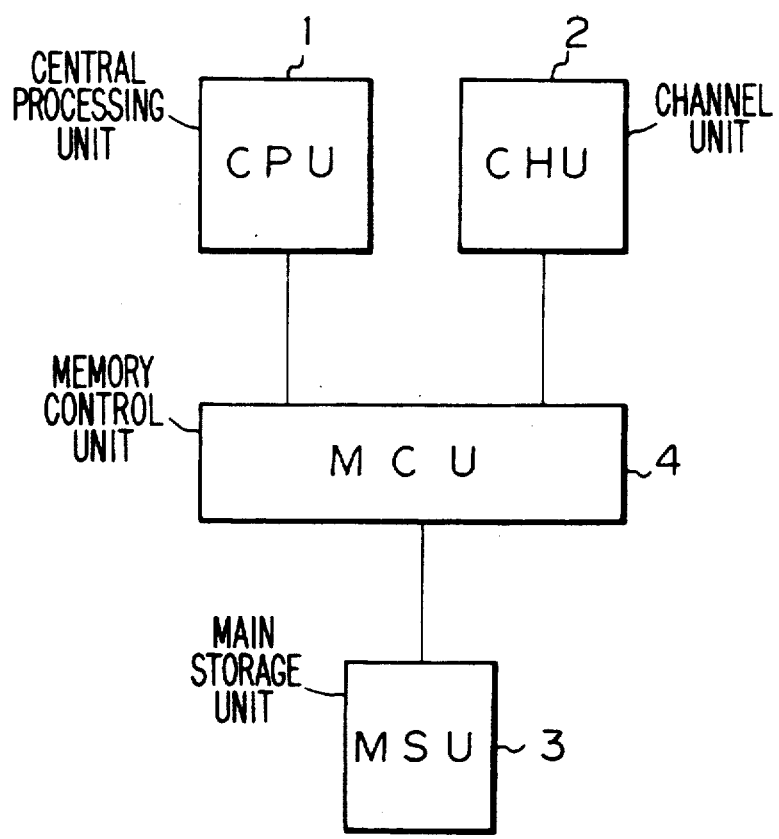
FIG. 1 is a block circuit diagram of an example of a general data processing system comprising a memory system having a two-level hierarchical structure.

As illustrated in FIG. 1, a general data processing system or a data processor comprises a CPU 1, a channel unit (CHU) 2, a main storage unit (MSU) 3, and a memory control unit (MCU) 4 which couples all these units. The CHU 2 controls one or more channels which are connected thereto and to which one or more input/output apparatuses and the like are coupled. The MCU 4 effects memory-access control between the CPU 1, the CHU 2, and the MSU 3.

Figure 2:
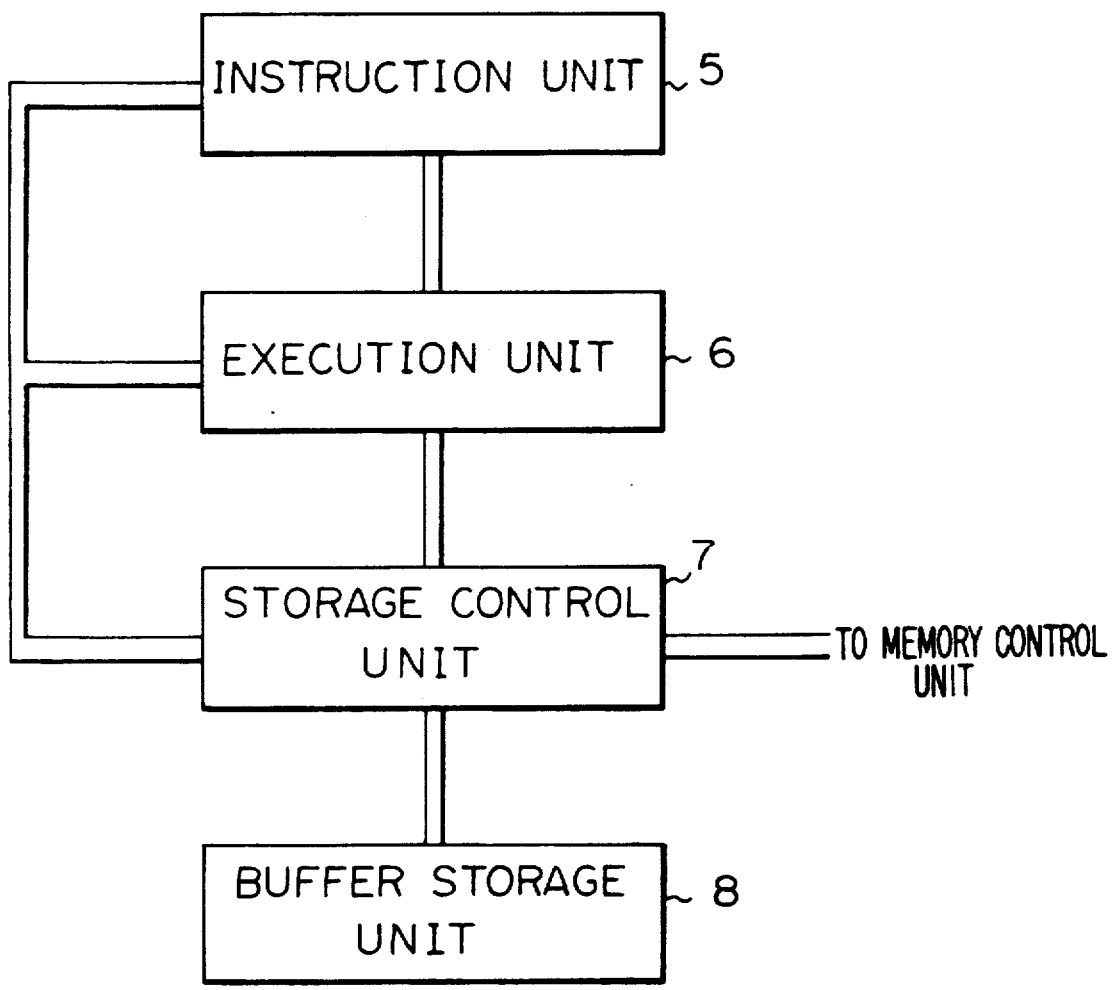
FIG. 2 is a block circuit diagram of the detailed structure of a central processing unit (CPU) used in the data processing system of FIG. 1.

The CPU 1 comprises, as shown in FIG. 2, an instruction unit 5, an execution unit 6, a storage control unit 7, and a buffer storage or high speed buffer (HSB) 8.

In FIG. 2, the instruction unit 5 fetches and decodes instructions sequentially and controls the operation of the execution unit 6, and the storage control unit 7. The execution unit 6 effects operations in accordance with instructions decoded by the instruction unit 5, thereby executing the instructions sequentially. The storage control unit 7 controls the access operation to the HSB 8 and the MSU 3 (FIG. 1) and is connected to the MCU 4 (FIG. 1). The HSB 8 and the MSU 3 compose a memory system having a two-level hierarchical structure.

In the above-mentioned system, the storing operation to the HSB 8 is performed by the routine of detecting, first, whether or not the address, to which data is stored, is in the HSB 8 and of effecting the actual write operation when the address is found in the HSB 8.

Figure 3:
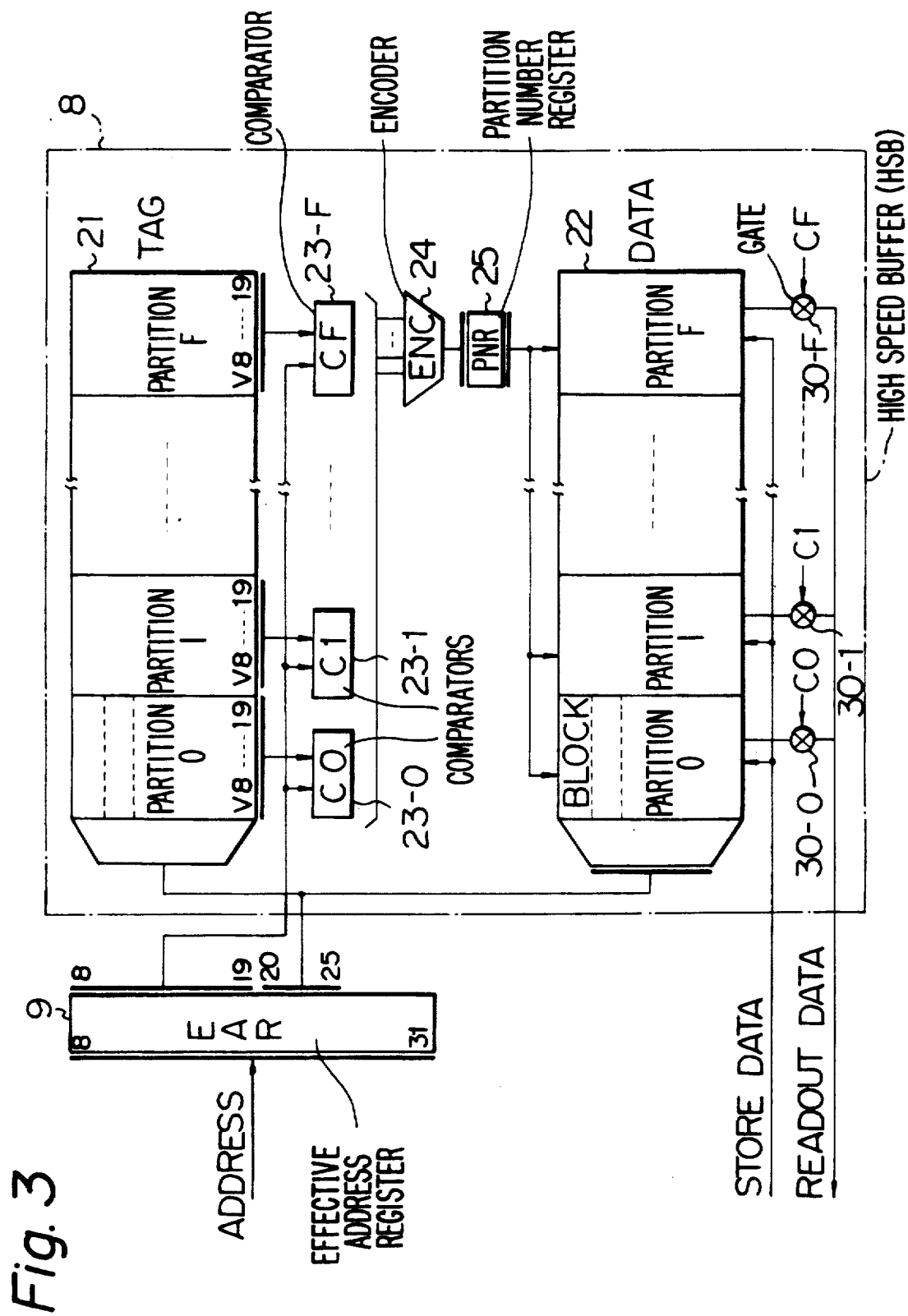
FIG. 3 is a block circuit diagram of a buffer storage used in a conventional buffer-storage control system.
Figure 4:
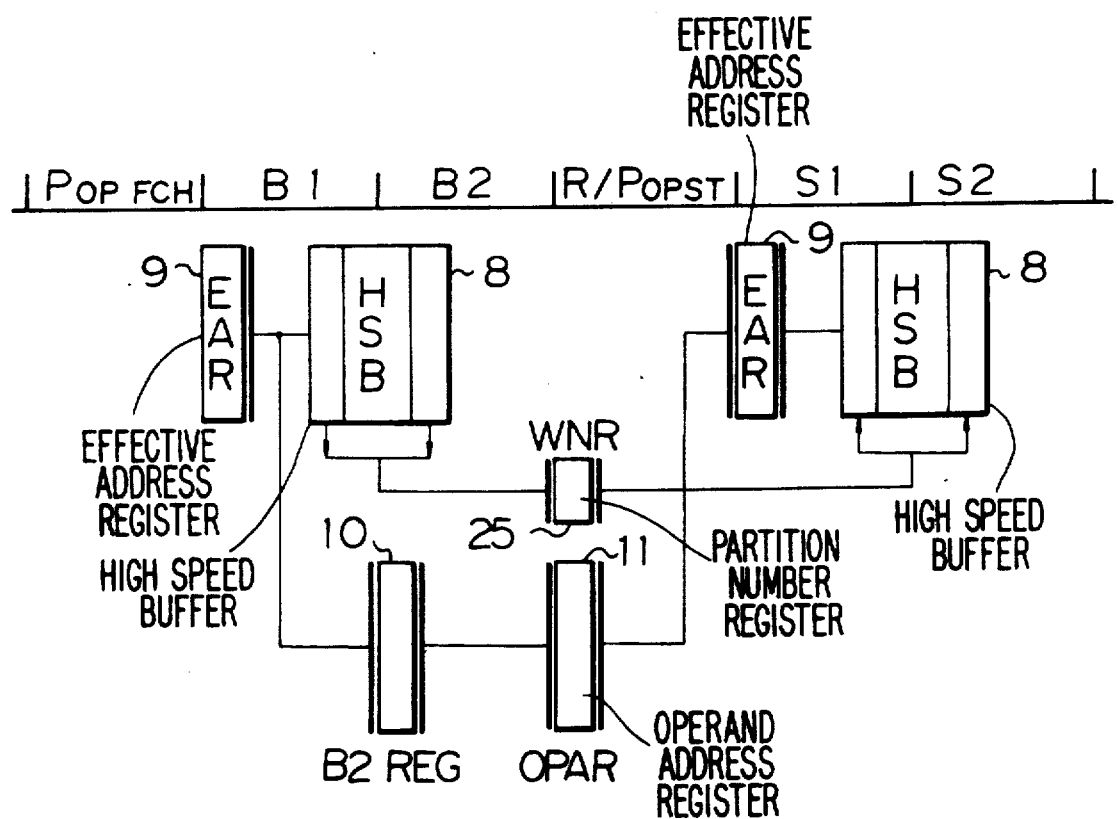
FIG. 4 is a timing diagram of the storing operation in the circuit of FIG. 3.

FIG. 3 is a block circuit diagram of circuit portions relating to the storing operation to the HSB 8 of a conventional system. FIG. 4 is a time chart of the storing operation corresponding to the block circuit diagram of FIG. 3. In these drawings, 9 designates an effective address register (EAR) which is provided in the storage control unit 7 and which receives an address for an instruction-fetching operation or operand-access operation from the instruction unit 5 (FIG. 2) in the CPU. In the HSB 8, 21 designates a tag portion; 22 a data portion; 23-0, 23-1, . . . , 23-F comparators; 24 an encoder; 25 a partition number register (PNR); 10 and 11 a B2 register and an operand address register (OPAR), both provided in the storage control unit 7; and 30-0, 30-1, . . . , 30-F gate circuits controlled by the outputs of the comparators 23-0, 23-1, . . . , 23-F to pass the read data from the ways 0 through F of the data portion 22, respectively.

The tag portion comprises, for example, 16 partitions (partition 0, partition 1, . . . partition F) each having, for example, 64 entries. The data portion 22 also comprises, for example, 16 partitions, (partition 0, partition 1, . . . , partition F) each having, for example, 64 blocks. Each of the blocks of the partitions in the data portion 22 has a length of 64 bytes. Thus, the data portion has, for example, a memory capacity of 64 Kbytes. Each of the blocks of the partitions in the tag portion 21 memorizes or stores a validity bit and upper address bits 8 through 19 of the data stored in the corresponding block of the data portion 22.

In the storing operation, the HSB 8 is read by using a storing address, and it is checked whether or not the storing address is found in the HSB 8. In this case, the storing address is set into the EAR 9 shown in FIG. 3. By using bits 20 through 25 of the EAR 9 which correspond to a block address of the HSB 8, the content of the tag portion 21 of the HSB 8 is read. In the tag portion 21 are stored validity bits (V bits) indicating whether the contents thereof are valid or not and upper address bits 8 through 19 of the data stored in the corresponding block. If any of the above-mentioned valid bits (V bits) is in the "on" state, the upper address bits 8 through 19 and the bits 8 through 19 of the EAR 9 are compared by the comparators 23-0, 23-1, . . . , 23-F, thereby detecting whether the storing address is memorized in the HSB 8 or not. If any comparator indicates coincidence, the number of the corresponding partition is encoded by the encoder 24 and set in the PNR 25, which is used for designating the way number to be written when the actual write operation is effected.

An explanation will now be made of the storing operation in reference to FIG. 3 using the time chart in FIG. 4. At first, in a pipeline data processing system, a priority flip-flop Popfch which is used for setting a storing address to the EAR 9 and which indicates the priority of using a pipeline is set, and a priority cycle (P-cycle) starts. Thereafter, the content of the tag portion 21 of the HSB 8 is read in two cycles B1 (buffer 1) and B2 (buffer 2). At the end of the B2 cycle, the PNR 25 is subjected to a write operation. The address data set in the EAR 9 is shifted into a B2 register 10 at the B2 cycle and memorized in the OPAR 11 at an R cycle. When the write operation to the HBS 8 is effected, a priority flip-flop Popst is set, the write address is loaded from the OPAR 11 to the EAR 9, and data is written into the block in a corresponding partition of the data portion 22 of the HSB 8 designated by the content of the PNR 25.

Figure 5A:
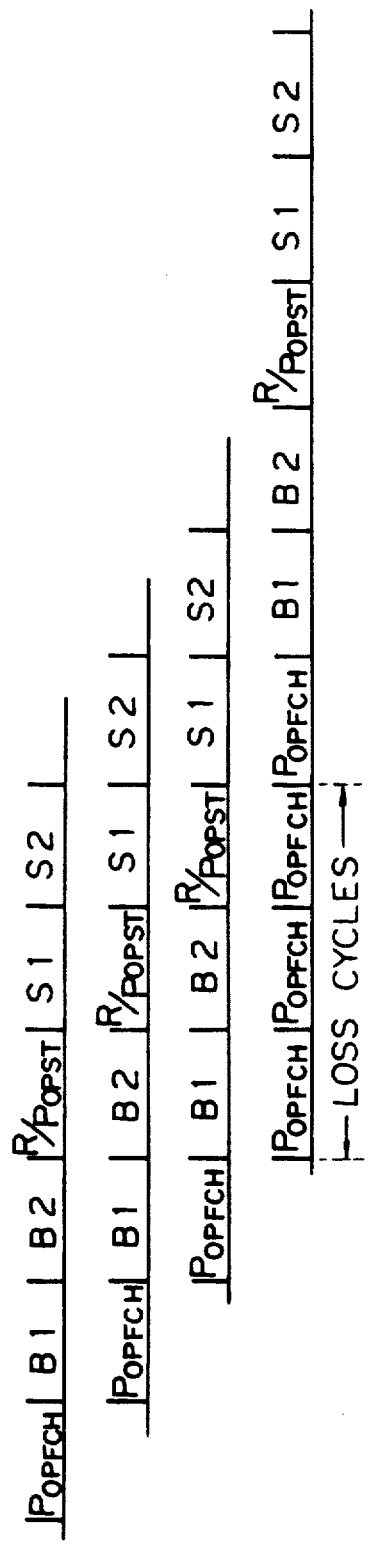
FIG. 5A is a time chart of a pipeline processing sequence in a data processing system using a conventional buffer-storage control system.

Since there is one EAR 9, when such a storing operation is continuously effected and if the setting timings of setting the afore-mentioned priority flip-flops Popfch and Popst overlap, the setting of the Popfch of the succeeding instruction is delayed, as illustrated in the time chart of FIG. 5A. This wastes machine cycles and reduces the processing ability of the data processor.

Figure 5B:
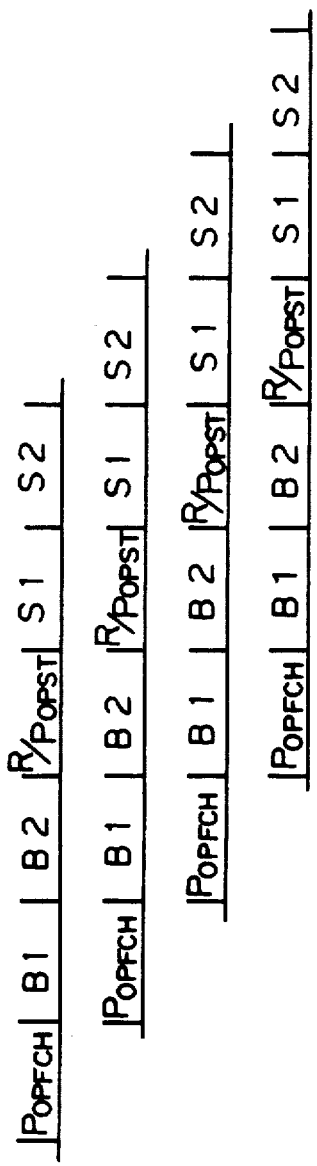
FIG. 5B is a time chart of a pipeline processing sequence in a data processing system using a buffer-storage control system according to the present invention.

According to the present invention, the priority flip-flops Popfch and Popst can be simultaneously processed as shown in FIG. 5B, thereby preventing delay of the processing by a priority flip-flop Popfch of a succeeding instruction due to a priority flip-flop Popst of a preceding instruction.

An embodiment of the present invention is explained with reference to the drawings.

Figure 6:
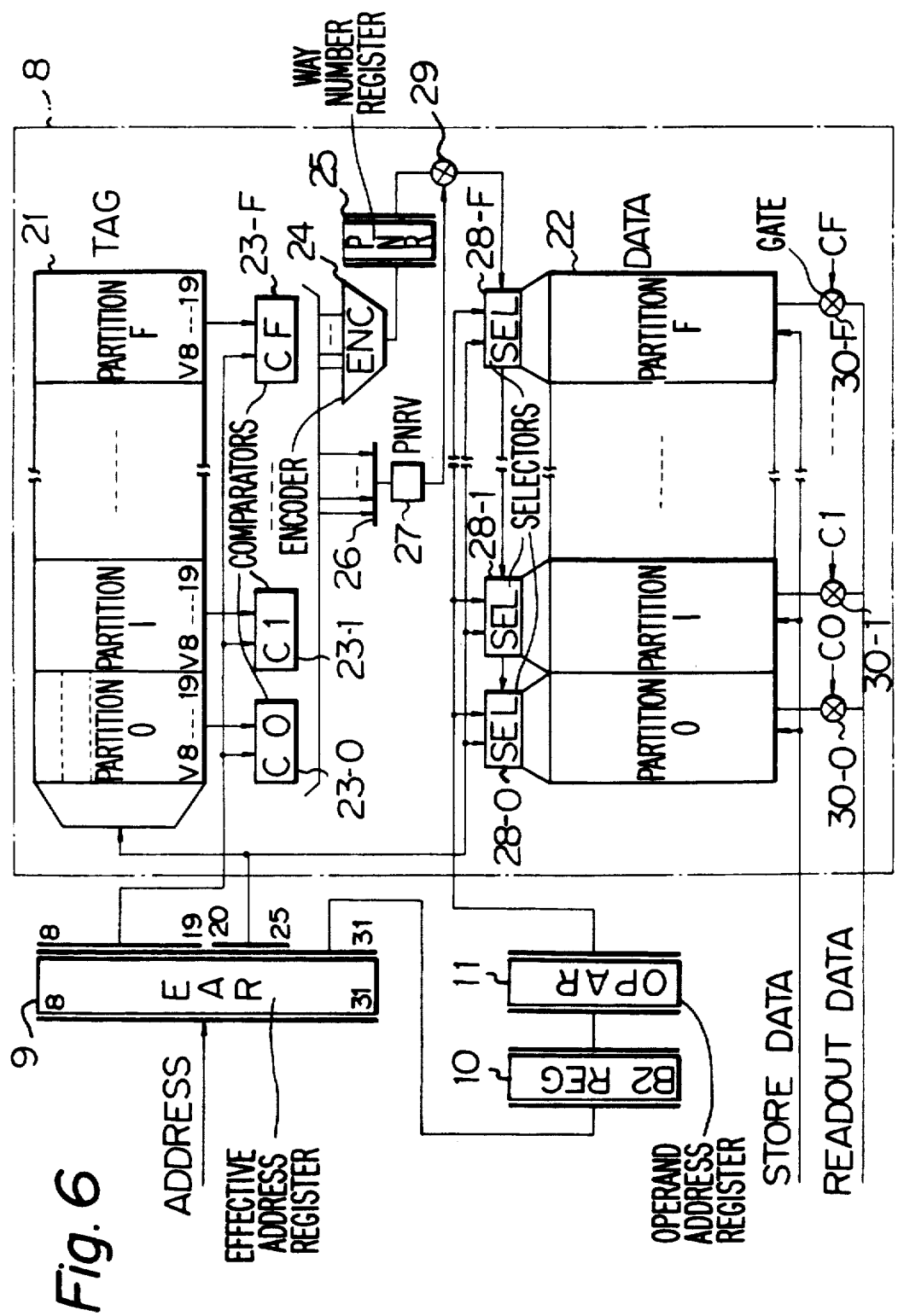
FIG. 6 is a block circuit diagram of a buffer storage used in a buffer-storage control system according to an embodiment of the present invention.

FIG. 6 illustrates a buffer storage and the like used in a system as an embodiment of the present invention. In FIG. 6, reference numerals 8, 9, 21, 22, 23-0, 23-1, . . . , 23-F, 24, 25, 30-0, 30-1, . . . , 30-F designate the same parts as those explained with reference to FIG. 3. Reference numerals 28-0, 28-1, . . . , 28-F designate selectors (SEL) which are necessary for implementing the present invention and which have the function of switching the address data for accessing a data portion 22 of an HSB 8.

The buffer-storage control system of FIG. 6 includes the high speed buffer 8, the first means having the effective address register 9, the comparators 23-0, 23-1, . . . 23-F, the encoder 24, the partition number register 25, and the partition number validity bit 27, the second means having the B2 register 10, the operand address register 11 and the partition-coincidence detecting circuit (FIG. 7), and the selector means 28-0, 28-1, . . . 28-F.

In this embodiment, the tag portion 21 of the HSB 8 is accessed by using bits 20 through 25 of an EAR 9. Regarding the data portion 22 of the HSB 8, it is possible to select either use of bits 20 through 25 of the EAR 9 as address data for each partition or use of bits 20 through 25 of an OPAR 11 as address data.

The circuits for this selection are the SEL 28-0, 28-1, . . . , 28-F which are controlled by the output signal of the PNR 25. That is, they are controlled so that only one partition, in the data portion 22 of the HSB 8, designated by the content of the PNR 25, is accessed by using the bits 20 through 25 of the OPAR 11 explained with reference to FIG. 4. The simultaneously processed read operation is controlled so that the tag portion 21 of the HSB 8 and the data portion 22, except for the partition designated by the content of the PNR 25, are accessed by using bits 20 through 25 of the EAR 9.

By controlling the operation in this manner, the read operation from partitions other than the above-mentioned partition to be written-in and the write operation are executed in the same machine cycle.

Another embodiment of the present invention will now be explained. The embodiment is implemented by using circuits including an OR circuit 26, a partition number register valid bit (PNRV) 27, and a gate circuit 29, shown in FIG. 6.

In the above-mentioned embodiment, when buffer-storage control of the "store-through" type is effected, if the storing address is not memorized or stored in the tag portion 21 of the HSB 8, the PNRV 27 is set by using the OR signal of the coincidence signals C0, C1, . . . , CF output from the comparators 23-0, 23-1, . . . , 23-F corresponding to the partitions 0 through F, considering the fact that in this case it is not necessary to write in the data portion 22. If no coincidence signal is obtained from any comparator, the PNRV 27 is kept in an "off" condition. The gate circuit 29 is controlled by the thus obtained PNRV signal so that all the SEL 28-0, 28-1, . . . , 28-F select the bits 20 through 25 of the EAR 9.

In a write operation controlled in the above-mentioned manner, if no partition in the tag portion 21 of the HSB 8 memorizes the storing address, and accordingly it is not necessary to effect an actual write operation, the read access to the data portion of the high speed buffer HSB is allowed unconditionally in the same machine cycle when an actual write operation is effected, it is possible to effect the write operation and a read operation in the same machine cycle if the partitions in the tag portion 21 and the data portion do not coincide. Thereby, the processing ability of the system is increased.

Figure 7:
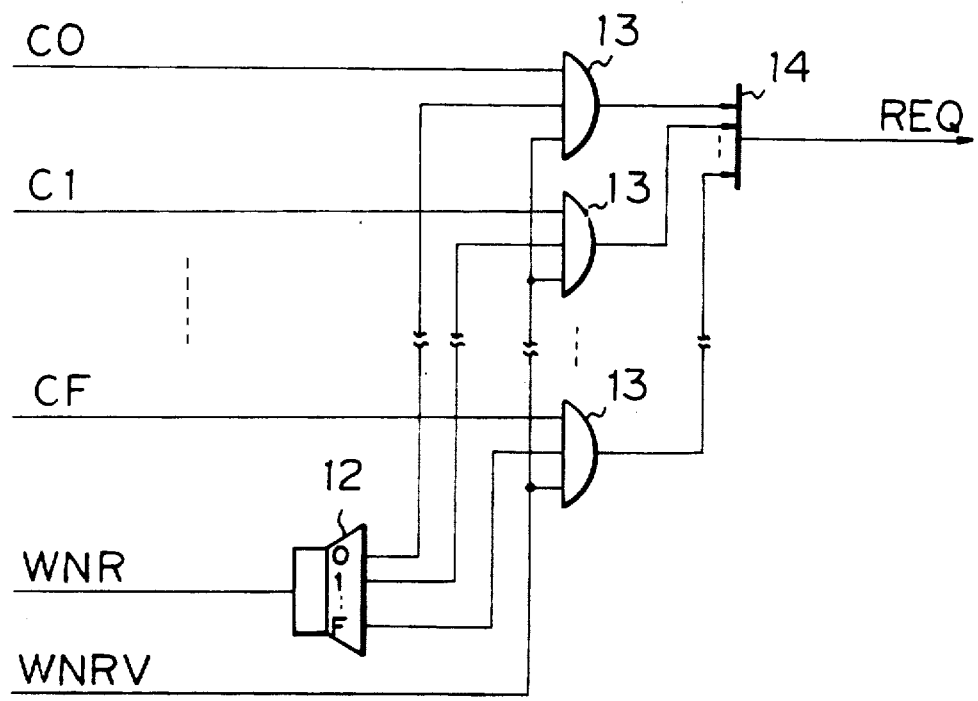
FIG. 7 is a block circuit diagram of a partition coincidence detecting circuit used for executing a re-read operation and connected to the circuit of FIG. 6.

In the read operation, if the read address is memorized in the tag portion 21 of the HSB 8 and the partition number thereof coincides with the way number for the write operation, the system is controlled so that the read operation is again executed by a partition-coincidence detecting circuit shown in FIG. 7. In FIG. 7, reference numeral 12 designates a decoder for decoding the partition number, reference numerals 13 AND circuits, and reference numeral 14 an OR circuit.

In the circuit of FIG. 7, when the read address and the write address use the same partition numbers of HSB TAG 21, each of the coincidence outputs C0, C1, . . . , CF of the comparators 23-0, 23-1, . . . , 23-F for every partition of the HSB 8 relating to the read address, each of the outputs of which relate to the write address and which are obtained from the decoder 12 decoding the contents of the PNR 25 shown in FIG. 6, and the PNRV 27 corresponding to the content of the content of the PNR 25, are logically operated by the AND circuit 13, so that the re-read request signal REQ corresponding to the above-mentioned read address is generated.

As mentioned above in detail, in a data processing system which effects pipeline processing according to the present invention, it is possible to execute a read operation and write operation of a buffer storage in the same machine cycle. Especially in a buffer-storage control system of the "store-through" type, when the storing address is not memorized or stored in the buffer storage, the read operation is executed unconditionally in the same machine cycle. Even when the write operation is effected the read operation is executed again only when the partition of the tag portion of the buffer storage coincides with the portion of the read address. Therefore, the pipeline processing in the above-mentioned data processor can be efficiently executed, and the processing ability of the overall system can be increased.

I claim:

1. A buffer-storage control system for a data processor and a main storage, comprising:
    a buffer storage including a tag portion and a data portion, each said tag and data portion including the same number of partitions, each partition being divided into the same number of blocks identified by the value of a predetermined plurality of bits of an address corresponding to said main storage supplied from said processor, additional bits of said address being stored in each block of said tag portion, for specifying that respective data from said main storage is stored at the same corresponding block of said data portion of the corresponding partition,
    first means for supplying said predetermined plurality of bits of the address for a succession of machine cycles, and including means for determining from the respective block of each said partition of the tag portion, during each said machine cycle, whether said additional bits of the address stored in each block of said tag portion is stored in said data portion,
    second means for storing said predetermined plurality of bits of the address of each said machine cycle when it is determined that said additional bits are stored in said tag portion, including said bits identifying said blocks of said partitions of said portions, said second means including a partition coincidence detecting circuit for determining, during said subsequent machine cycle, data storage coincidence indicating that the respective data is stored in the same respective partition of the data portion, and selector means, provided for each of said partitions of the data portion, for carrying out a selection of an address to be supplied to each of said partitions between address bits supplied from the first means and address bits stored in the second means, the selection being controlled in the manner that the address stored in the second means is selected for the partition concerning which a target data desired to be stored is detected in the preceding cycle by a tag portion, while the address from the first means is selected for the other partitions;

wherein, when it is determined by said first means that a store address exists in tag portion of the first partition in a first cycle, the second data to be read exists in the second partition in a second cycle, and the second partition is not the same as the first partition, then the first data is stored into the first partition in parallel with the reading of the second data from the second partition in the second cycle, and when it is determined that a store address exists in a partition in a cycle of a store request, and a storing to a data portion of said partition based on said address is being carried out in the subsequent cycle, a read operation is carried out, in parallel with said storing, in all partitions of said tag portion and in partitions other than the partitions in which said storing is being carried responsive to an address of the subsequent read request.

2. The device of claim 1, said first means further comprising:
- a comparator connected to receive data bits stored in the part of the respective partition of said tag portion and additional bits of said address of each said machine cycle from said first means, for making the determination of whether the respective data is stored in said data portion, and
- a partition number register, responsive to the result of the determination by said comparator, for storing data identifying the partition into which data is to be stored in said subsequent machine cycle,
- wherein said predetermined plurality of bits of the address, as a block address, determines said block of said partition into which data is to be stored in said subsequent machine cycle.

3. The device of claim 2, said selector means includes:
- a selector for selecting each said partition of said data portion responsive to selection data,
- wherein said data stored in said partition number register is provided as selection data to said selector to select the respective one of said partitions for storing said first data into respective partition in said subsequent machine cycle, while said predetermined plurality of bits of said address of said subsequent machine cycle is provided from said first means to each other of said partitions of said data portion, and the output of said comparator controls the reading out of the data stored in said data portion.

4. The device of claim 3, wherein said first means comprises:
- an OR circuit receiving outputs from said comparator and for outputting a corresponding valid bit signal,
- a gate circuit, connected between the partition number register and the selector for the data portion, for controlling close/open of a path from the partition number register to the selector by the valid bit signal of the partition register valid bit,
- wherein said data stored in said partition number register is selectively provided to said selector.

5. A buffer storage control system for a data processor having a machine cycle and a main storage unit, comprising:
- a buffer storage unit connected to said main storage unit and including tag and data units divided into selectable partitions each having separate read and write paths, the tag partitions holding data addresses of data stored in corresponding data partitions; and
- buffer storage addressing means connected to said buffer storage unit and said data processor, for reading from one data partition and writing into a tag partition within the machine cycle responsive to different first reading and second writing request addresses provided by said data processor by using means for comparing the first request address, provided by said data processor, to the data addresses stored in the tag partitions to identify a data partition corresponding to the tag partition, means for storing a coincidence indicator for a match indicated by said means for comparing, and selector means for selectively applying the first and second addresses to the data partitions within the machine cycle and responsive to the coincidence indicator.

* * * * *

UNITED STATES PATENT AND TRADEMARK OFFICE
CERTIFICATE OF CORRECTION

PATENT NO. : 5,097,414

DATED : March 17, 1992

INVENTOR(S) : Hirosada Tone

It is certified that error appears in the above-identified patent and that said Letters Patent is hereby corrected as shown below:

```
Column 2, line 45, delete "passes";
          line 51, "way" should be --partition--.
Column 4, line 26, "way" should be --partition--.
Column 5, line 58, after "cycle" insert --. Even--;
          line 66, "way" should be --partition--.
```

Signed and Sealed this

Seventeenth Day of August, 1993

*Attest:*

BRUCE LEHMAN

*Attesting Officer*  *Commissioner of Patents and Trademarks*